Oct. 10, 1950     W. J. BROWN     2,524,762
PHASE SHIFT CIRCUIT
Filed Oct. 15, 1947     2 Sheets-Sheet 1

INVENTOR.
BY Walter J. Brown
Stoodling and Krost
attys

Oct. 10, 1950     W. J. BROWN     2,524,762
PHASE SHIFT CIRCUIT
Filed Oct. 15, 1947                    2 Sheets-Sheet 2

INVENTOR.
Walter J. Brown
BY
Stoodling and Kra
atty.

Patented Oct. 10, 1950

2,524,762

UNITED STATES PATENT OFFICE 2,524,762

PHASE SHIFT CIRCUIT

Walter J. Brown, Cleveland Heights, Ohio

Application October 15, 1947, Serial No. 779,909

21 Claims. (Cl. 323—124)

My invention pertains in general to phase shift circuits, and more particularly to sensitive phase shift circuits that are capable of shifting the phase of the output voltage more than 180 degrees relative to the input voltage while maintaining the output voltage at a substantially constant magnitude.

Reference may be had to my copending applications filed August 28, 1947, entitled "Phase Shift System," "Phase Shift Network" and "Phase Shift Bridge," application Serial Nos. 770,968, 770,966, and 770,967, respectively. This application is a parent application of my continuation-in-part application, Ser. No. 172,647, entitled "Motor Control Circuit," filed July 8, 1950.

An object of my invention is a phase shift circuit containing two fixed branch circuits, one for establishing a reference voltage and the other for establishing the potential at one output terminal of the circuit, with an inductance and a capacitance serially connected across that part of the fixed branch circuit establishing the reference voltage.

Another object of my invention is a phase shift circuit including a first and a second reactive branch serially connected and excited by a reference voltage in which the output voltage of the circuit is variable in phase by more than 180 degrees but does not vary materially in magnitude when the relative reactance of the reactance branches are varied while maintaining a substantially constant Q therein.

Another object of my invention is a phase shift circuit having a capacitance and an inductance relatively variable to establish an arcuate locus of more than 180 degrees spanning a reference vector, which locus is substantially circular over a desired part of the working range, said reference vector being established by a branch circuit, and a separate branch circuit for establishing a point potential substantially in the center of the circular portion of said locus, the output of said circuit being represented by a radius of said arcuate locus.

Other objects and a fuller understanding of my invention may be had by referring to the accompanying description and claims, taken in conjunction with the drawing, in which:

Figure 1:
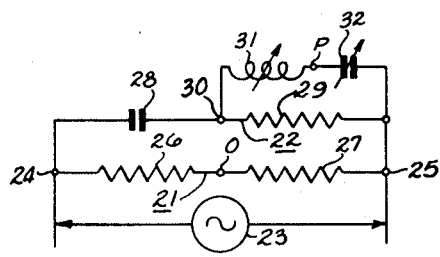
Figure 1 is a schematic diagram of the preferred embodiment of my invention.

My invention embodies various circuits for obtaining a wide angle phase shift that is sensitive and yet maintains a reasonably constant magnitude of output voltage over a desired working range. The Figure 1 illustrates the preferred embodiment of my invention, and incorporates a first branch circuit 21 and a second branch circuit 22 energized from an alternating current source 23. The alternating current source 23 has first and second terminals 24 and 25 to which the first and second branch circuits 21 and 22 are connected. The first branch circuit 21 establishes a first output terminal O which is intermediate the end terminals 24 and 25. The first output terminal O is established at the juncture of the first and second impedance elements 26 and 27, which are shown as resistances. The second branch circuit 22 includes third and fourth impedance elements 28 and 29 that are serially connected at a juncture 30. The third and fourth impedance elements 28 and 29 have been shown as a capacitor and a resistor respectively. An inductive element 31 and a capacitive element 32 are serially connected across the fourth impedance element 29 with a second output terminal P connected between the inductance element 31 and capacitive element 32.

Figure 2:
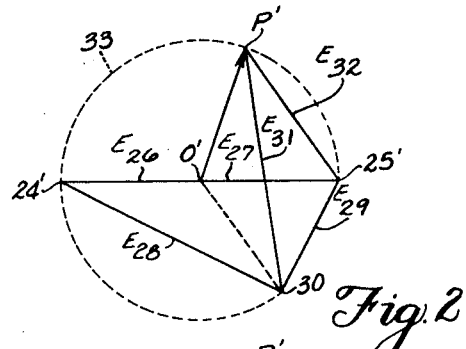
Figure 2 is a voltage vector diagram depicting the voltage vectors obtainable from the circuit of Figure 1.

The voltage vector diagram shown in Figure 2 depicts the voltage vectors obtainable from the circuit of Figure 1 wherein the vector 24'—25' represents the fixed base line vector as established by the alternating current source 23. The voltage drops across the first and second impedance elements 26 and 27 span this base line vector and are shown as the vectors $E_{26}$ and $E_{27}$. The juncture of the first and second impedance elements 26 and 27 establishes the potential at the first output terminal O, which has been shown as substantially midway between the ends of the vector 24'—25'. The third and fourth impedance elements 28 and 29, which have been shown as a capacitor and a resistor, respectively, establish the voltage vectors $E_{28}$ and $E_{29}$. These last mentioned vectors have been shown as being substantially at right angles or in quadrature relationship to each other. This may also be stated that the phase angles of the third and fourth impedance elements are substantially in quadrature relationship to each other. The juncture 30 of the third and fourth impedance elements 28 and 29 is designated as having a potential represented by the point 30' on the voltage vector diagram. The angle 24'—30'—25' is therefore represented as being substantially a right angle, as hereinbefore stated, which designates that the condenser 28 has a very high Q or a phase angle closely approximating 90° at a given constant frequency. The inductive element 31 and the capacitive element 32 are serially connected across the fourth impedance element 29, and consequently the voltage vector of these inductive and capacitive elements 31 and 32 are designated by the vectors $E_{31}$ and $E_{32}$. The potential at the second output terminal P is designated by the relative position of the point P' on the voltage vector diagram of the Figure 2. The inductive and capacitive elements 31 and 32 have both been shown as being variable, and this is meant to designate that either or both are variable, the essential facts being that these two elements are relatively variable in impedance. When the inductive and capacitive elements 31 and 32 are relatively varied, and the Q of the varying element or elements is kept constant as it is varied, it may then be shown that the point P' on the voltage vector diagram will describe an arcuate locus 33 having the base line 25'—30' as a chord of this arc. This arc will be a true arc of a circle if the Q of the varying elements is kept constant as they are varied. Methods of keeping the Q substantially constant are known to those skilled in the art, and my copending applications referred to above show one such method, which is to employ a thermionic reactance tube as the variable reactance. The preferred form of reactance tube comprises a pentode having a very high internal plate resistance, such that the plate current is substantially independent of plate voltage. The pentode is operated at constant screen voltage, and an alternating current feedback circuit is provided from plate to grid so as to establish an alternating current grid-cathode voltage which is substantially in quadrature with the alternating current plate-cathode voltage, and which is superimposed on a direct current negative grid-biasing voltage. The alternating current plate current is in phase with the alternating current grid-cathode voltage and is accordingly substantially in quadrature with the alternating current anode-cathode voltage. Accordingly, the tube exhibits the properties of a reactance having a Q which is dependent upon how nearly the phase angle of the alternating current feedback circuit approximates 90 degrees.

The magnitude of the reactance is varied by varying the mutual conductance of the tube by altering either the direct current negative grid bias or the direct current screen voltage. The phase angle of the reactance remains constant since it is equivalent to the phase angle of the alternating current feedback circuit which is not varied.

The purpose of making the locus of the point P' an arc of a circle is to achieve a constant magnitude of output voltage as the relative phase is varied. To accomplish this end, the point O' is vectorially established at the center of this arcuate locus. For the condition of a perfect condenser 28, that is with the angle 24'—30'—25' a right angle, the relative magnitudes of the resistance 29 and condenser 28, and the Q of the inductive and capacitive elements 31 and 32 may be adjusted so that each of the vectors 24'—30' and 25'—30' will be chords of the arcuate locus and the chord 24'—25' will be the diameter of the circle. The point O' should then be located midway intermediate the ends 24' and 25' in order to establish this point O' at the center of this circle. The triangle O'—25'—30' therefore becomes an isosceles triangle having the vector 25'—30' as the base, and with the radius O'—25' equal to the radius O'—30'.

Figure 3:
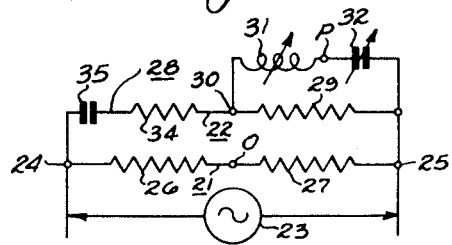
Figure 3 is a schematic diagram of a modification of my invention.
Figure 4:
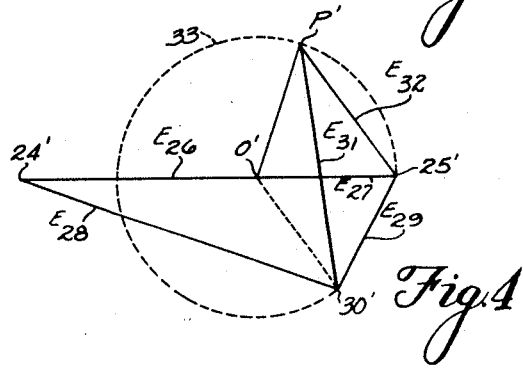
Figure 4 is a voltage vector diagram of the voltage vectors obtainable from the circuit of Figure 3.

Figure 3 shows a modification of my circuit, which will establish voltage vectors on a voltage vector diagram similar to that shown in Figure 2, or more generally to the voltage vector diagram shown in Figure 4. The circuit of Figure 3 shows the first branch circuit 21 as again consisting of first and second impedance elements 26 and 27, again shown as resistances. The second branch circuit 22 has third and fourth impedance elements, and the third impedance element 28 includes a resistor 34 as well as a condenser 35. The third and fourth impedance elements are again serially connected at the juncture 30, and the inductive and capacitive elements 31 and 32 are again serially connected across the fourth impedance element with the second output terminal P connected therebetween. The resistor 34 may be considered as the inherent resistance of the condenser 35, or may be considered as a separate resistance entirely.

The voltage vector diagram of Figure 4 denotes the voltage vectors obtainable from the circuit of Figure 3, and the similarity to the vector diagram of Figure 2 may be noted. The third and fourth impedance elements 28 and 29 cause voltage vectors $E_{28}$ and $E_{29}$ that are no longer exactly at right angles, but still may be considered as approaching a quadrature relationship. The vector 25'—30' is again the chord of the arcuate locus 33 described by the point P' as the inductive and capacitive elements 31 and 32 are relatively varied. To establish the point O' at the center of this arcuate locus, the triangle O'—25'—30' must again be made an isosceles triangle having the vector 25'—30' as the base. To accomplish this, the point O' must be established to the right of the mid-point of the vector 24'—25. By correct design of the circuit elements, such a position may be found to establish such an isosceles triangle.

Figure 5:
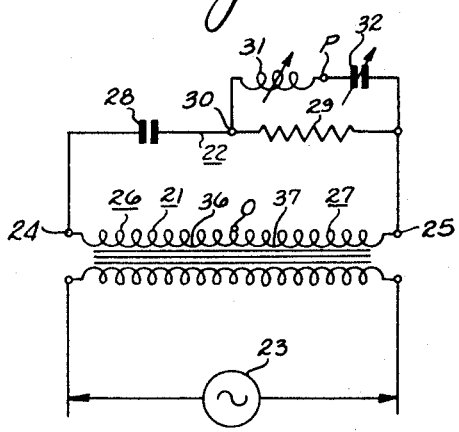
Figure 5 is a schematic diagram of a further modification of my invention.

The schematic diagram shown in Figure 5 is a further modification of my invention wherein the first branch circuit 21 is also part of the energizing circuit from the alternating voltage source 23. The first and second impedance elements 26 and 27 are shown as inductive windings 36 and 37, and although they do have a phase angle differing from zero at the given constant frequency, nevertheless are of practically identical phase angle and hence the vectors $E_{26}$ and $E_{27}$ lie in substantially a straight line between the points 24' and 25'. The point O' is established by a tap intermediate the ends 24 and 25 such that an isosceles triangle is formed by the points O'—30'—25' with the vector 25'—30' as the base thereof. The vector diagram of Figure 2 represents the voltage vectors obtainable from the circuit of Figure 5. The voltage vector diagram of Figure 4 may also be used to represent the voltage vectors obtainable from the circuit of Figure 5 if there is inherent or physical resistance associated with the condenser 28.

Figure 6:
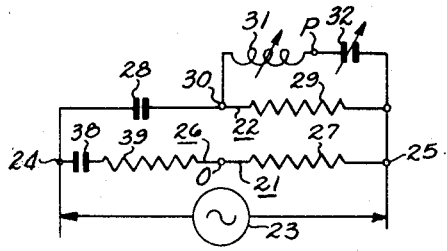
Figures 6 and 8 are schematic diagrams of further modifications of my invention.
Figure 7:
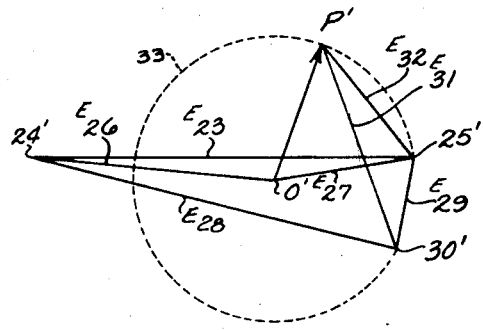
Figure 7 is a voltage vector diagram of the voltage vectors obtainable from the circuits of Figures 6 and 8.

The schematic diagram of the Figure 6 is a still further modification wherein the voltage vectors obtainable therefrom may be shown by the voltage vector diagram of Figure 7.

The first impedance element 26 shown in the first branch circuit 21 is now shown as including a capacitive element 38 serially connected to a resistance 39. The first and second impedance elements 26 and 27 have an approximately equivalent phase angle at the given constant frequency of the alternating current source 23. The effect of the capacitive element 38 in the first impedance element 26 is shown in the vector diagram of Figure 7 wherein it may be seen that the voltage vectors $E_{26}$ and $E_{27}$ do not lie on a straight line with the input voltage vector $E_{23}$, but deviate from this straight line by placing the point O' below the input voltage vector 23. Such a circuit arrangement is useful if it is desired to shift the initial phase of the output voltage relative to the phase of the applied voltage.

Figure 8:
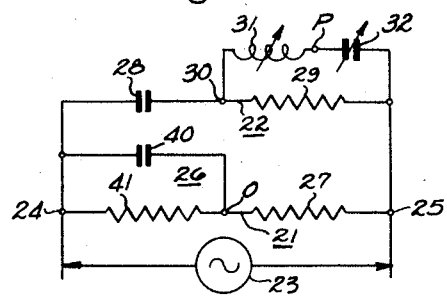

The schematic diagram shown in Figure 8 shows an alternative method for procuring the voltage vector diagram shown in Figure 7. The first impedance element 26 is shown as including a capacitance element 40 and a resistance element 41 connected in parallel which again will cause a negative phase angle of the vector $E_{26}$ relative to the input vector $E_{23}$ with counterclockwise rotation of the vectors. The voltage vector $E_{26}$ may therefore be stated as lagging the applied voltage vector $E_{23}$.

Figure 9:
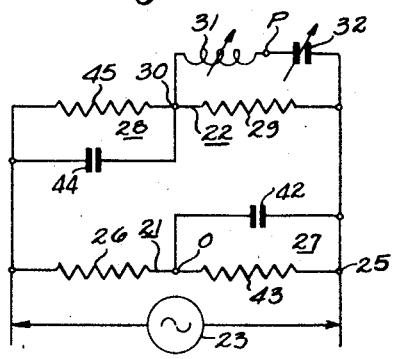
Figure 9 is a schematic diagram of a further modification of my invention.
Figure 10:
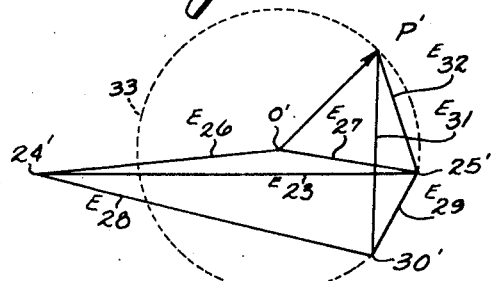
Figure 10 is a voltage vector diagram of the voltage vectors obtainable from the circuit of Figure 9.

The schematic diagram of Figure 9 shows a further modification of my invention wherein the second impedance element 27 is shown as including a capacitance element 42 and a resistance element 43 in parallel, and the third impedance element 28 is shown as including a capacitance element 44 and a resistor 45 in parallel. The voltage vectors of the circuit of Figure 9 are shown in the vector diagram of Figure 10 wherein it may be seen that the voltage vectors $E_{27}$ and $E_{28}$ lag the applied voltage vector $E_{23}$, inasmuch as they have a capacitive component. The circuit of Figure 9 raises the point O' above the vector $E_{23}$ in the voltage vector diagram of Figure 10, and just as in the voltage vector diagram of Figure 7, this circuit of Figure 9 may be useful to adjust one limit of the phase of the output voltage relative to the applied voltage vector $E_{23}$. In practice, the output voltage across the output terminals O and P is often applied to an output transformer in order to isolate this phase shift circuit from the rest of the controlled mechanism. Such an output transformer will have a finite impedance that has an inductive component; therefore, it has been found that the vector OP will not rotate clockwise completely to the limit of the point 25' because this output transformer provides an inductive component in parallel with the capacitive element 32. By correct design, the vector $E_{27}$ may therefore be made to lag the applied voltage $E_{23}$ by a given amount, for example 10 or 20 degrees, such that the load of such an output transformer across the output terminals O and P will place the initial position or most clockwise rotational position of the vector O'—P' substantially in phase with the applied voltage vector $E_{23}$.

Figure 11:
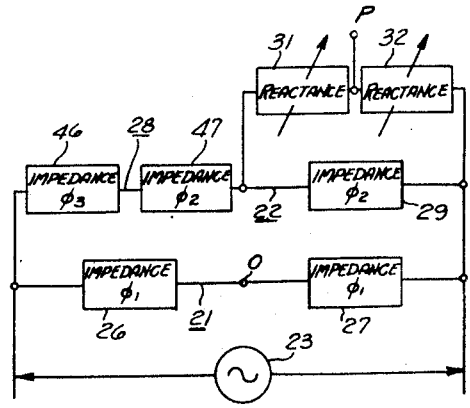
Figure 11 is a schematic diagram of a generic case of my invention.

The schematic diagram shown in Figure 11 is a generic representation of the schematic diagrams formerly shown by specific voltage examples. The alternating current source 23 energizes first and second fixed branch circuits 21 and 22 wherein the first fixed branch circuit 21 is shown as including first and second impedance elements 26 and 27, and the second fixed branch circuit 22 is shown as including third and fourth impedance elements 28 and 29. The inductive and capacitive elements 31 and 32 have been shown as variable reactances serially connected across the fourth impedance element 29 with the second output terminal P connected therebetween. The first and second impedance elements 26 and 27 are serially connected at the first output terminal O. The first and second impedance elements 26 and 27 have been designated $\phi_1$, to represent the fact that the first and second impedance elements 26 and 27 have a first phase angle substantially equivalent to each other. If the first phase angle $\phi_1$ is identical in both the first and second impedance elements 26 and 27, then the vectors $E_{26}$ and $E_{27}$ will lie on a straight line superimposed on the vector $E_{23}$, as shown in the Figures 2 and 4. If the phase angle in the first impedance element 26 is slightly different than the phase angle of the second impedance element 27, then the potential of the first output terminal O' will not be located directly on the input voltage vector $E_{23}$, but will be above or below this vector as shown in the vector diagrams of Figures 7 or 10. The fourth impedance element 29 is shown as having a second phase angle $\phi_2$ which may be the same or different from the first phase angle $\phi_1$. The third impedance element 28 is shown as including first and second impedance devices 46 and 47 respectively, with the first impedance device 46 shown as having a third phase angle $\phi_3$ and with the second impedance device 47 shown as having a second phase angle $\phi_2$. The third phase angle $\phi_3$ shall be defined as having a phase angle of $\phi_2$ plus or minus 90 degrees. The phase angle $\phi_3$ being approximately 90 degrees shifted relative to the second phase angle $\phi_2$, the third and fourth impedance elements will have a substantially quadrature relationship, determined by the magnitude of the second impedance device 47. An analogy may be drawn to the schematic circuit diagram shown in Figure 3 wherein the resistive elements 34 and 29 have substantially the same phase angle, which might be designated the second phase angle, and the capacitive element 35 has a phase angle shifted 90 degrees relative to this second phase angle $\phi_2$ which may be designated $\phi_3$. If the magnitude of the second impedance device 47 is zero, the voltage vector diagram shown in Figure 2 will apply to the circuit of Figure 11, whereas if this second impedance device 47 has some finite impedance, then the voltage vector diagram of Figure 4 will be applicable. The triangle 24'—25'—30' of Figures 2 and 4 may also be inverted, that is, with point 30' above the vector $E_{26}$. In the first branch circuit 21, should the first and second impedance elements 26 and 27 have a slightly different phase angle, then the voltage vectors obtainable therefrom may be shown by the voltage vector diagrams of Figures 7 or 10.

Figure 12:
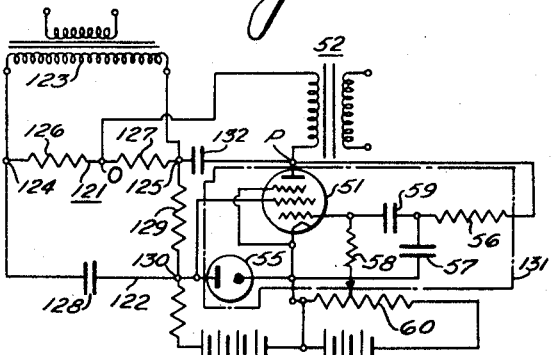
Figure 12 is a schematic diagram of a circuit similar to the circuit of Figure 1 but incorporating a thermionic reactance tube as the variable inductance.

The circuit diagram of Figure 12 shows a circuit quite similar to that shown in Figure 1 but incorporating a reactance tube 51. Circuit elements in the circuit of Figure 12 which are identical to the circuit elements of the Figure 1 have reference characters 100 units higher than the corresponding circuit elements of Figure 1. The reference character 123 in this case represents a transformer which may be considered as a voltage source for energizing the first and second branch circuits 121 and 122. The first branch circuit 121 includes the resistances 126 and 127 and the second branch circuit 122 includes the resistance 129 and capacitor 128. The inductive element 131 and capacitive element 132 are serially connected with the output terminal P connected therebetween and the inductive element 131 is shown by the dash-dot line. An output transformer 52 has been shown as being connected between the output terminals O and P, since such an output transformer is commonly used where the phase shifter is controlling the phase of voltage applied to grids of controllable rectifier tubes. The inductive element 131 includes the thermionic tube 51 which has been connected to act as a variable inductance. The tube 51 has been shown as a thermionic pentode although other tubes with a high internal plate-cathode resistance, such as a tetrode, will operate quite satisfactorily. A unidirectional high voltage source 53 is used to supply operating voltages to the plate of the tube 51 and another unidirectional voltage source 54 is used to supply control grid voltages to the tube 51. These voltage sources 53 and 54 have diagrammatically been shown as batteries but any suitable source may be utilized. A voltage regulator tube 55 is preferably used to maintain constant the voltage applied to the screen grid of the tube 51. The alternating current feedback path to make the tube 51 operate as an inductance includes the resistor 56 and condenser 57 which establishes the alternating current grid-cathode voltage substantially in quadrature with the alternating current plate-cathode voltage. The direct current negative biasing voltage on the control grid is superimposed on the alternating current grid-cathode voltage through resistance 58 from potentiometer 60 and is isolated by the condenser 59. The alternating current component of the plate current is in phase with the alternating current grid-cathode voltage. Resistance 56 is preferably high compared with the reactance of condenser 57 and accordingly the alternating current voltage across condenser 57 lags the plate-cathode voltage by almost 90 degrees. The reactance of isolating condenser 59 is low compared with the resistance 56 so that the alternating current grid-cathode voltage is approximately in phase with the alternating current voltage across condenser 57 and, therefore, lags the plate-cathode voltage by an angle which is almost 90 degrees and which is constant. Accordingly, the plate current lags the plate-cathode voltage by a constant phase angle of almost 90 degrees and the tube 51 therefore exhibits the properties of an inductive reactance of constant Q. The magnitude of the alternating current component of the plate current may be varied by altering the direct current bias from potentiometer 60 applied through resistance 58 which varies the transconductance of the tube 51, and this varies the effective reactance of the tube 51. However, the phase angle of the alternating current plate current in relation to the plate-cathode alternating current voltage remains constant since this is determined solely by the values of resistors 56 and 58 and condensers 57 and 59, and accordingly the Q remains constant while the reactance is varied.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A phase shifting circuit comprising a first branch circuit including first and second impedance elements serially connected and having a first output terminal connected therebetween, means for developing an alternating voltage across said first branch circuit, a second branch circuit connected in parallel with said said first branch circuit and including a third and a fourth impedance element serially connected, a third branch circuit connected in parallel with said fourth impedance element and including an inductive and a capacitive element serially connected with a second output terminal connected therebetween, whereby on a voltage vector diagram the voltage developed in said first branch circuit may be represented by a fixed base line vector, said third and fourth impedance elements establish voltage vectors spanning said fixed base line vector, the voltage vector of said fourth impedance element constituting a reference vector, and means for varying the relative impedance of said inductive and capacitive elements so that on said voltage vector diagram the locus of the potential of the second output terminal lies on an arc spanning said reference vector, while the potential of said first output terminal lies within the space bounded by said arc and said reference vector.

2. A phase shifting circuit comprising a first branch circuit including first and second impedance elements serially connected and having a first output terminal connected therebetween, means for developing an alternating voltage across said first branch circuit, a second branch circuit connected in parallel with said first branch circuit and including third and fourth impedance elements serially connected with a reference terminal therebetween, said second and fourth impedance elements having a common terminal, a third branch circuit connected in parallel with said fourth impedance element and including an inductive and a capacitive element serially connected with a second output terminal therebetween, and means for varying the relative reactance of said inductive and capacitive elements while maintaining a substantially constant Q therein over a given working range such that the magnitudes of the voltages developed between the first and the second output terminal, the first output terminal and the reference terminal, and the first output terminal and said common terminal are substantially equal over said working range.

3. A phase shifting network for use with a periodic voltage source operable at a given frequency, said shifting network circuit having first and second output terminals and comprising first and second impedance arms serially connected for energization from said periodic voltage source and having said first output terminal connected therebetween, third and fourth impedance arms serially connected and energized from said periodic voltage source, an inductive and a capacitive arm serially connected across said fourth impedance arm with said second output terminal connected therebetween, whereby on a voltage vector diagram the voltage of said periodic voltage source may be represented by a fixed base line vector, said first and second impedance arms establish voltage vectors spanning said fixed base line vector, said third and fourth impedance arms establish voltage vectors spanning said fixed base line vector, the voltage vector of said fourth impedance arm constituting a reference vector, and means for varying the relative impedance of said inductive and capacitive arms over a given working range so that on said voltage vector diagram the potential of said second output terminal describes a locus which lies upon an arc spanning said reference vector and the potential of said first output terminal lies within the space bounded by said arc and said reference vector.

4. In combination with an alternating voltage source having two terminals, the provision of a phase shift circuit having first and second output terminals, first and second fixed branch circuits paralleled across the terminals of said alternating voltage source, a capacitive and an inductive element serially connected across a portion of said second branch circuit with said first output terminal connected therebetween, said second output terminal being connected intermediate the ends of said first branch circuit, and means for varying the relative reactance of said inductive and capacitive elements.

5. In combination with an alternating voltage source having two terminals, the provision of a phase shift circuit having first and second output terminals, first and second impedance elements serially connected across the terminals of the alternating voltage source with said first output terminal connected therebetween, third and fourth impedance elements serially connected across the terminals of said alternating voltage source, an inductive and a capacitive element serially connected across said third impedance element with said second output terminal connected therebetween, and means for varying the relative reactance of said inductive and capacitive elements.

6. In combination with an alternating voltage source operable at a constant frequency and having two terminals, the provision of a phase shift circuit having first and second output terminals, a first impedance element having a first phase angle at said constant frequency, a second impedance element serially connected to said first impedance element with a first juncture therebetween, said second impedance element having a second phase angle substantially the same as said first phase angle, means for connecting said serially connected first and second impedance elements across the terminals of said alternating voltage source, a third impedance element having a third phase angle at said constant frequency, a fourth impedance element serially connected to said third impedance element with a second juncture therebetween, said fourth impedance element having a fourth phase angle approaching a quadrature relationship relative to said third phase angle, means for connecting said serially connected third and fourth impedance elements across the terminals of said alternating voltage source, an inductive element and a capacitive element serially connected to the ends of one of said impedance elements with said second output terminal connected therebetween, one of said junctures being said first output terminal such that the voltages developed between said first output terminal and the respective ends of said one impedance element are substantially equal, and means for varying the relative reactance of said inductive and capacitive elements while maintaining a substantially constant Q therein over the desired working range such that the potential difference developed between said first and second output terminals remains substantially constant while variable in phase by at least 180° relative to said alternating voltage source over said working range.

7. In combination with an alternating voltage source having two terminals, the provision of a phase shift circuit having first and second output terminals, a capacitor and a first resistive element only serially connected across the terminals of the alternating voltage source, a second and a third resistive element serially connected across the terminals of said alternating voltage source with said first output terminal connected therebetween, an inductive and a second capacitive element serially connected across said first resistive element with said second output terminal connected therebetween, and means for varying the relative reactance of said inductive and second capacitive elements.

8. In combination with an alternating voltage source having two terminals, the provision of a phase shift circuit having first and second output terminals, a first capacitive element, a first resistive element and a second resistive element serially connected across the terminals of the alternating voltage source, a third and a fourth resistive element serially connected across the terminals of said alternating voltage source with said first output terminal connected therebetween, an inductive and a second capacitive element serially connected across said second resistive element with said second output terminal connected therebetween, and means for varying the relative reactance of said inductive and second capacitive elements.

9. In combination with an alternating voltage source having two terminals, the provision of a phase shift circuit having first and second output terminals, a resistive element and a first capacitive element serially connected across the terminals of the alternating voltage source, an inductive winding having said first output terminal connected intermediate the ends thereof and being connected across the terminals of said alternating voltage source, an inductive and a second capacitive element serially connected across said resistive element with said second output terminal connected therebetween, and means for varying the relative reactance of said inductive and second capacitive elements.

10. In combination with an alternating voltage source, the provision of a phase shifting circuit having first and second output terminals, said phase shifting circuit including a branch circuit having two serially connected circuit elements with the first output terminal connected therebetween, means for exciting said circuit elements from said alternating voltage source, a capacitive element and an inductive element serially connected with said second output terminal connected therebetween, means for exciting said serially connected capacitive and inductive elements with an alternating voltage having a fixed magnitude and phase relationship with respect to said alternating voltage source, means for varying the relative reactance of said serially connected capacitive and inductive elements, and means for maintaining a substantially constant Q in said elements over a desired part of a working range as said elements are relatively reactively varied, whereby the voltage established between said first and second output terminals will have a substantially constant magnitude over said desired part of the working range and be variable in phase by more than 180° with respect to said alternating voltage source.

11. A complete phase shifting circuit having a first and a second output terminal comprising, a first fixed branch circuit adapted to be excited from a source of alternating potential difference for establishing at said first output terminal a fixed potential, a second fixed branch circuit adapted to be excited from the same source of alternating potential difference and to establish across a part of said second branch circuit an alternating potential difference having a fixed magnitude and phase relationship relative to said source of alternating potential difference, a variable branch circuit connected across said part of said second fixed branch circuit and comprising a capacitive and an inductive element serially connected with said second output terminal connected therebetween, and means for varying the relative reactance of said elements and thereby in conjunction with said fixed circuits establishing between said output terminals a potential difference variable in phase relative to the source of potential difference.

12. A complete phase shifting circuit having first, second, third and fourth terminals including first, second and third branch circuits, said first and second terminals being the input terminals and said third and fourth terminals being the output terminals of said complete circuit, said first branch circuit including said first, third and second terminals, said second branch circuit including said first and second terminals, means for exciting said first and second branch circuits with an alternating voltage input, said third branch circuit including said second and fourth terminals, a capacitive element, an inductive element, means for serially connecting said elements with said fourth terminal therebetween, means for exciting said serially connected elements by connection across a part of said second branch circuit with an alternating voltage having an ascertainable magnitude and phase relationship with respect to said alternating voltage input, means for varying the relative impedance of said elements, and means for maintaining a substantially constant Q over a desired part of a working range as said elements are relatively reactively varied, whereby the voltage between said output terminals will be of substantially constant magnitude over said part of the working range and variable in phase by more than 180° with respect to said alternating voltage input.

13. A complete phase shifting circuit having first, second, third and fourth terminals including first, second and third branch circuits, said first and second terminals being the input terminals and said third and fourth terminals being the output terminals of said complete circuit, said first branch circuit including said first, third and second terminals, said second branch circuit including said first and second terminals, means for exciting said first and second branch circuits with an alternating voltage input, said third branch circuit including said second and fourth terminals, a capacitive element, an inductive element, means for serially connecting said elements with said fourth terminal therebetween, means for exciting said serially connected elements by connection across a part of said second branch circuit with an alternating voltage having a fixed magnitude and phase relationship with respect to said alternating voltage input, and means for varying the relative reactance of said elements, whereby the voltage between said output terminals will be variable in phase by more than 180° with respect to said alternating voltage input.

14. A complete phase shifting circuit comprising a first and a second branch circuit connected in parallel and energized from a source of alternating potential difference, an intermediate tap on said first branch circuit which comprises a first output terminal, the potential difference between said first output terminal and one side of said source having a fixed phase relationship to the said source, a second intermediate tap on said second branch circuit, a capacitive and an inductive reactance serially connected between said second intermediate tap and one end of said second branch circuit, a second output terminal connected between said capacitive and inductive reactance, and means for varying the relative value of said reactances whereby the potential difference between the first and second output terminals may be shifted in phase by more than 180° in relation to the phase of said source 15. A complete phase shifting circuit comprising a first and a second branch circuit connected in parallel between a first and second terminal, means for developing an alternating voltage between said terminals, a third terminal connected to an intermediate point on said first branch circuit, a fourth terminal connected to an intermediate point on said second branch circuit, said intermediate points being so located that the alternating voltage between the third and second terminals is similar in amplitude to the alternating voltage between the third and fourth terminals, a third branch circuit connected between said second and fourth terminals and including an inductive and a capacitive reactance in series with a fifth terminal connected therebetween, and means to vary the relative value of said reactances whereby the alternating voltage between the third and fifth terminals is shifted in phase.

16. A phase shifting network comprising first and second impedance arms serially connected between first and second input terminals, a first output terminal connected to a first branch point between said impedance arms, means for developing an alternating voltage between said input terminals, third and fourth impedance arms also serially connected between said input terminals and having a second branch point therebetween, a reference terminal connected to the second branch point, and first and second reactive arms of opposite sign serially connected across said fourth impedance arm with a second output terminal connected therebetween whereby on a voltage vector diagram the voltage between the first output terminal and the second input terminal is substantially equal to the voltage between the first output terminal and the reference terminal while the phase of the voltage vector between the first and second output terminals is variable by more than 180° when the relative impedance of the first and second reactive arms is varied.

17. A phase shifting circuit including a first and a second terminal, means for developing an alternating voltage between said terminals, a first and a second impedance element having similar phase angles and serially connected between said first and second terminals and with a first output terminal connected therebetween, a third and a fourth impedance element having phase angles differing from each other by approximately ninety degrees and being serially connected between said first and second terminals and with a third terminal connected therebetween, a first and a second reactive element of opposite sign serially connected between said second and third terminals and having a second output terminal connected therebetween, and means for varying the relative reactance of said reactive elements, whereby the alternating voltage between said first and second output terminals is shifted in phase.

18. A phase shifting circuit comprising an energized transformer winding having first, second and third terminals, a first and a second impedance arm having different phase angles and serially connected across said first and third terminals with a fourth terminal connected therebetween, a first and a second reactive arm of opposite sign serially connected across said fourth and third terminals with a fifth terminal connected therebetween, and means for varying the relative impedance of said reactive arms whereby the voltage across said second and fifth terminals is shifted in phase.

19. In combination with an alternating voltage source, the provision of a phase shifting network having first and second output terminals, an inductive winding having said first output terminal connected intermediate the ends thereof, a resistive arm and a first capacitive arm serially connected across the ends of said inductive winding, means for energizing said inductive winding from said alternating voltage source, an inductive and a second capacitive arm serially connected across said resistive arm with said second output terminal connected therebetween, and means for varying the relative impedance of said inductive and said second capacitive arms.

20. In combination with an alternating voltage source, the provision of a phase shift circuit having first and second output terminals, first and second branch circuits energized from said alternating voltage source, a capacitive and an inductive element serially connected across at least a portion of said second branch circuit as a reference voltage with said second output terminal connected therebetween, means for varying the relative impedance of said inductive and capacitive elements, and means for establishing a potential at said first output terminal from said first branch circuit such that the locus of the potential of the second output terminal lies, in a vector diagram, on an arc spanning said reference voltage vector, and the potential of said first output terminal lies, in the vector diagram, within the space bounded by the reference voltage vector and said arc.

21. In combination with an alternating voltage source, the provision of a phase shifting circuit having first and second output terminals, said phase shifting circuit including a branch circuit having two serially connected circuit elements with the first output terminal connected therebetween, means for exciting said circuit elements from said alternating voltage source, a capacitive element and an inductive element serially connected with said second output terminal connected therebetween, means for exciting said serially connected capacitive and inductive elements with an alternating voltage having a definite magnitude and phase relationship with respect to said alternating voltage source, means for varying the relative impedance of said serially connected capacitive and inductive elements to achieve an output voltage shiftable in phase relative to said alternating voltage source.

WALTER J. BROWN.

REFERENCES CITED

The following references are of record in the file of this patent:

UNITED STATES PATENTS

| Number | Name | Date |
|---|---|---|
| 1,900,538 | Bedford | Mar. 7, 1933 |
| 1,911,051 | Bedford | May 23, 1933 |
| 1,921,788 | Suits | Aug. 8, 1933 |
| 2,158,871 | Jacobsen | May 16, 1939 |
| 2,407,140 | Coake | Sept. 3, 1946 |

---

Certificate of Correction

Patent No. 2,524,762            October 10, 1950

WALTER J. BROWN

It is hereby certified that error appears in the printed specification of the above numbered patent requiring correction as follows:

Column 8, line 68, for the words "said shifting network circuit" read *said phase shifting network*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*